United States Patent
Piekarz

(10) Patent No.: US 7,496,448 B2
(45) Date of Patent: Feb. 24, 2009

(54) NAVIGATION INSTALLATION AND METHOD FOR EXTRACTING INFORMATION TRANSMITTED IN ENCRYPTED FORM

(75) Inventor: Roman Piekarz, Mielec (PL)

(73) Assignee: Bury Sp. z.o.o., Mielec (PL)

( * ) Notice: Subject to any disclaimer, the term of this patent is extended or adjusted under 35 U.S.C. 154(b) by 2 days.

(21) Appl. No.: 11/425,890

(22) Filed: Jun. 22, 2006

(65) Prior Publication Data

US 2007/0027611 A1    Feb. 1, 2007

(30) Foreign Application Priority Data

Jun. 23, 2005    (DE) ................. 10 2005 029 594

(51) Int. Cl.
*G01C 21/30* (2006.01)
(52) U.S. Cl. ...................... 701/210; 713/183
(58) Field of Classification Search ............. 701/210, 701/200; 713/193, 183
See application file for complete search history.

(56) References Cited

U.S. PATENT DOCUMENTS

| | | | | |
|---|---|---|---|---|
| 5,563,947 A | * | 10/1996 | Kikinis | 705/51 |
| 5,787,170 A | * | 7/1998 | Op de Beek | 713/165 |
| 6,104,815 A | | 8/2000 | Alcorn et al. | 380/251 |
| 6,768,942 B1 | | 7/2004 | Chojnacki | 701/200 |
| 7,185,369 B2 | * | 2/2007 | Thoone et al. | 726/30 |
| 2001/0018635 A1 | * | 8/2001 | Miyasaka et al. | 701/200 |
| 2003/0084313 A1 | * | 5/2003 | Tada | 713/193 |
| 2003/0177094 A1 | | 9/2003 | Needham et al. | 705/50 |
| 2005/0033511 A1 | * | 2/2005 | Pechatnikov et al. | 701/210 |

FOREIGN PATENT DOCUMENTS

| | | |
|---|---|---|
| DE | 196 08 538 C1 | 3/1998 |
| EP | 0 735 380 A1 | 10/1996 |
| EP | 1 076 431 A2 | 2/2001 |
| EP | 1 338 943 A2 | 8/2003 |
| WO | WO 96/11446 | 4/1996 |

* cited by examiner

*Primary Examiner*—Mark Hellner
(74) *Attorney, Agent, or Firm*—Whitham Curtis Christofferson & Cook, PC

(57) ABSTRACT

A navigation unit having a data decryption algorithm is connected to a data storage and reading unit having a storage medium storing map data, the data storage and reading unit having a nonalterable access number, and the navigation unit connects to a broadcast radio receiver. The navigation unit receives, through the broadcast radio receiver, broadcast radio signals having encrypted information. The navigation unit reads the nonalterable access number, processes the number through a hash algorithm, and compares the processed access number to another access number to decrypt the encrypted information.

3 Claims, 1 Drawing Sheet

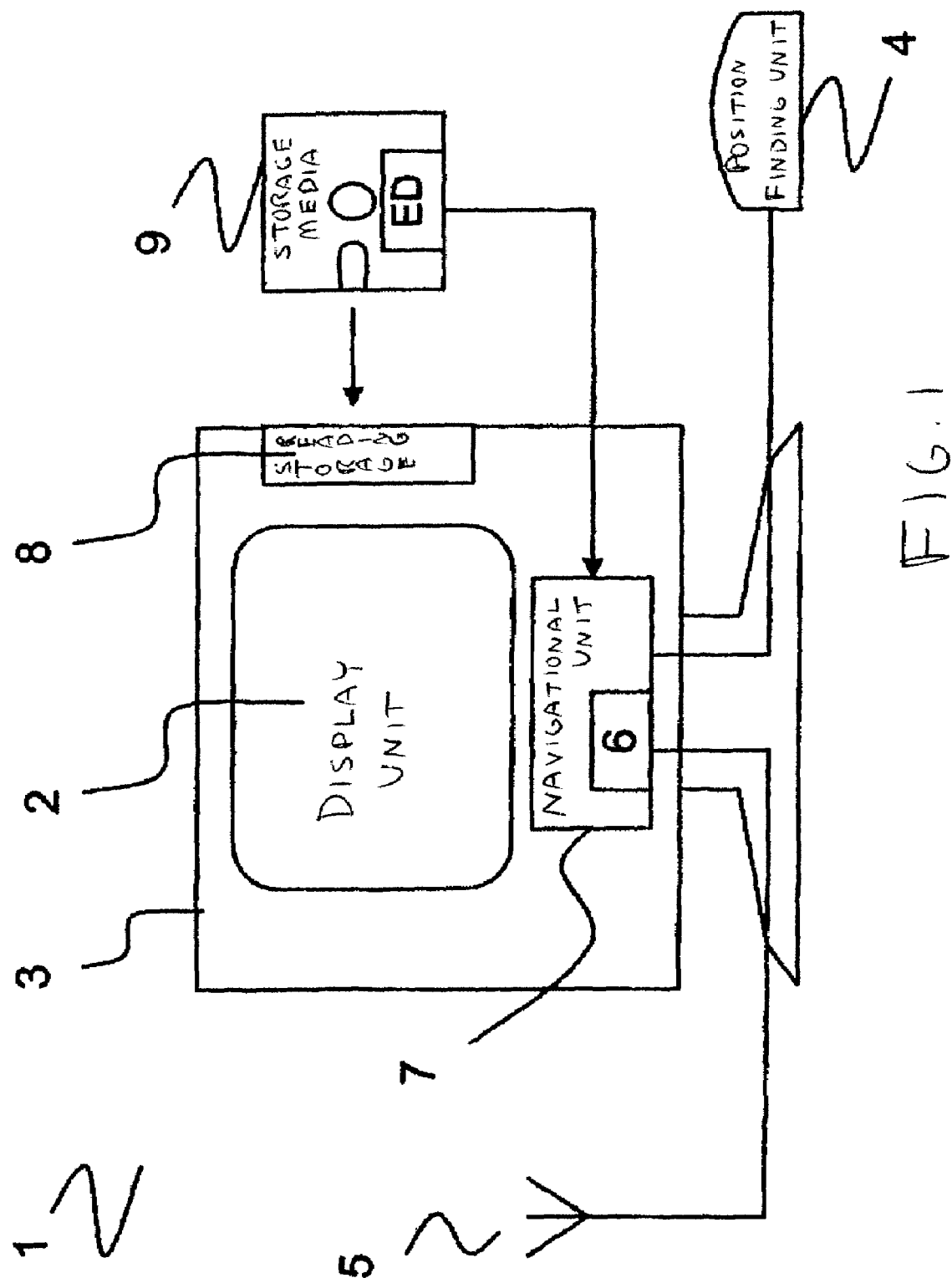

NAVIGATION INSTALLATION AND METHOD FOR EXTRACTING INFORMATION TRANSMITTED IN ENCRYPTED FORM

FIELD OF THE INVENTION

The invention relates to a navigation installation having a broadcast radio receiver for extracting information transmitted in encrypted form, particularly traffic information, from broadcast radio signals, having a navigation unit and having a data storage medium reading unit.

The invention also relates to a method for extracting information transmitted in encrypted form from broadcast radio signals with a navigation installation.

BACKGROUND OF THE INVENTION

To enable encrypted data which are transmitted by means of broadcast radio signals and which can be used only in return for a fee, it is known practice to provide the user with a license key. This can either be input manually as an access code or can be provided as a key record on a data storage medium for the purpose of executing a decryption algorithm.

Thus, by way of example, in order to use pay televisions, the users are provided with access authorization memory cards which, in conjunction with a video data decoder, allow an encrypted broadcast radio program to be decrypted.

To protect data and software which are stored and sold on a data storage medium against unauthorized use when unauthorized pirate copies have been produced, it is known practice to produce an access code comprising a license key and a license number stored on the data storage medium. Alternatively, the license number may be requested from the data supplier by telephone or using a computer network by indicating the license key which is printed on the data storage medium. The access code is then stored and allows the installed data, for example in the form of software, once enabled, to be used without requiring renewed authorization.

With knowledge of the license key and possibly of the enabling code, however, it is also possible for any third party to use the data in conjunction with an unauthorized copy of the data on a copy data storage medium.

It is also known practice to calculate the access code from a combination comprising a license key with the serial number of the data processing device processing the data. This has the drawback for the user that the inherently authorized data storage medium can be used only in conjunction with a single data processing device which the user stipulates when the data are enabled the first time.

SUMMARY OF THE INVENTION

It is an object of the invention to provide an improved navigation installation having a broadcast radio receiver for extracting information transmitted in encrypted form from broadcast radio signals in which the enabling of individual added-value services which are subject to a charge, particularly of traffic information transmitted in encrypted form, has optimum protection and can easily be managed.

The object is achieved with the navigation installation of the type mentioned at the outset by virtue of the navigation unit being set up to read decryption data which are stored on a data storage medium with the data storage medium reading unit and to extract encrypted information using the decryption data which have been read.

Storing decryption data on the data storage medium which is provided for operating the navigation installation anyway and which contains map material, for example, allows simple control of the enabling of added-value services.

The data storage medium can be provided with the decryption data at the factory itself, the user being billed for the added-value services when the data storage medium is actually purchased.

Replacing the data storage medium allows possibly different added-value services to be used depending on the respective decryption data which the data storage medium contains. These added-value services can be used in conjunction with the individual data storage medium in different navigation installations, since the decryption data are stored on the data storage medium and hence are independent of the navigation installation.

It is particularly advantageous if the decryption data comprise a decryption algorithm. This decryption algorithm can then be called by the navigation installation without the need for said navigation installation to be designed per se particularly for decrypting the information transmitted in encrypted form.

Storing the decryption data, including optionally the decryption algorithm, on the data storage medium has the advantage that the data storage medium can easily be updated using a computer network, for example the internet. It is thus possible for access authorization to be obtained over the internet by a provider, who subsequently sends the decryption data to the user, who stores these data on the data storage medium.

Extraction of the encrypted information may also be simple enabling of the use of added-value services on the basis of decryption data.

The object is also achieved by a method for extracting information transmitted in encrypted form from broadcast radio signals with a navigation installation as described above, the method including:

allocating a data storage medium number and storing the number on a data storage medium, the allocation being by the manufacturer of the data storage medium and, and the storing preferably being such that the number is stored unalterably on the data storage medium, generating an access code which is required for extracting the information based on the data storage medium number and a license number, and extracting the information if the access code is admissible.

BRIEF DESCRIPTION OF THE DRAWINGS

The invention is explained in more detail below using an exemplary embodiment with reference to the appended drawing, in which:

FIG. 1 shows a sketch of a navigation installation.

DETAILED DESCRIPTION OF ILLUSTRATIVE EMBODIMENTS

FIG. 1 shows a sketch of a navigation installation 1 with a display unit 2, in a housing 3, for showing the traffic and map routing. The navigation installation 1 can be operated wirelessly and/or by wire using a remote control, for example.

The navigation installation 1 is connected to a position-finding unit 4 and to a broadcast radio antenna 5. At least the broadcast radio antenna 5 is routed to a broadcast radio receiver 6 in the navigation unit 7, the broadcast radio receiver being configured to extract traffic information from broadcast radio signals received through the broadcast radio antenna 5.

The navigation installation 1 also has a data storage medium reading unit 8 for data storage media 9 that stores navigation data, particularly map material, for routing.

To enable the use of added-value services and particularly to use encrypted traffic information, which provides information going beyond the freely accessible traffic information in the form of Traffic Management Channel (TMC) services which are subject to a charge, decryption data ED are stored in and read from the data storage medium 9 with the data storage medium reading unit 8. The added-value services are enabled on the basis of the decryption data ED.

A decryption algorithm (not shown) may also be stored in and read from the data storage medium 9 to be executed in the navigation unit 7 to decrypt the encrypted added-value service information.

The navigational unit 7 and the decryption algorithm may be configured to enable the added-value service based on and in conjunction with a data storage medium serial number which is allocated by the manufacturer of a data storage medium 9 and which is stored unalterably on the data storage medium 9. The decryption algorithm may be configured to read this serial number from the data storage medium 9 by the navigation unit 7 using the data storage medium reading unit 8.

The data storage medium 9 may be configured to additionally store at least one access code. The navigational unit 7 and decryption algorithm, may be configured using, for example a secure hash algorithm, such that when the data storage medium serial number has been read, the navigation unit 7 generates an access code which is compared with the access code stored on the data storage medium 9.

In addition, navigational unit 7 and the decryption algorithm may be configured to generate the access code based on the data storage serial number in conjunction with a license number which is allocated individually for the user or for the data storage medium 9. The generated access code is then checked against the stored access code.

The decryption data ED may be stored on the data storage medium 9 at the factory itself. Alternatively, the navigational unit 7 and the decryption algorithm may be configured to update the data storage medium 9 and, optionally, to acquire time-limited authorization to use added-value services over a global computer network, e.g., the internet. The global computer network is then used to provide the decryption data ED to the user for storage on the data storage medium 9. A data storage medium 9 of this kind may be a compact flash memory card, for example.

A method performed according to the above description includes:

allocating a data storage medium number and storing the number on a data storage medium, where the allocation may be by the manufacturer of the data storage medium and, and where the storing is preferably such that the number is stored unalterably on the data storage medium, generating an access code which is required for extracting the information based on the data storage medium number and a license number, and extracting the information if the access code is admissible.

The present invention's coupling of the enabling of the added-value services to an unalterable serial number for the data storage medium, the serial number being allocated by the manufacturer of the data storage medium, provides protection against use of the added-value services in conjunction with an unauthorized copy of the data storage medium. This coupling employs the fact that conventional data storage media 9 are normally supplied with a data storage medium number can easily be read and, according to this invention, serves as a basis for calculating an access code.

by way of example, the data storage medium number may be used in conjunction at least with a license number which is allocated individually for the supplied data storage medium and which does not need to be secret. Thus, the license umber may be printed on the data storage medium's packaging or printed on the data storage medium itself, for example, or may be stored in the data storage medium in readable form.

In the embodiments of the invention, it is advantageous if the license number allocated fot an original data storage medium 9 is stored in and read from the data storage medium 9.

It is also advantageous if a record stored on the data storage medium, comprising at least a license number and an access code, and also the data storage medium number stored unalterably on the data storage medium by the manufacturer of the data storage medium, are read. The license number and the data storage medium number are used to generate an access code which is compared with the stored access code in order to enable extraction of the information.

The access code may be calculated using known algorithms, for example secure hash algorithms. The access code can be used to operate a decryption algorithm, provided on the data storage medium or in the navigation installation, for example, for decrypting encrypted data.

It is also advantageous if a serial code for the navigation installation is read and the information is extracted on the basis of the serial code. This restricts the access control for added-valute services to one particular navigation installation.

The invention claimed is:

1. A method for extracting traffic information data from traffic information in encrypted form in_broadcast radio signals, comprising:

providing a storage medium, having a writable portion for storing data, and having a structure unalterably storing a storage medium serial number formed in the manufacture of the storage medium;

providing a navigation unit having a radio receiver for receiving the broadcast radio signals and a reader for reading the writable portion of the storage medium and for reading the structure unalterably storing a storage medium serial number formed in the manufacture of the storage medium;

arranging said storage medium with said navigational unit;

reading said storage medium serial number from said storage medium, at the navigational unit;

inputting a given license number data to the navigational unit;

generating an access code, at the navigational unit, based on said reads storage medium number and said input license number;

determining whether or not said generated access code meets a given access code admissibility criterion; and extracting the traffic information data from the encrypted traffic information if said determining determines the access code admissibility criterion is met, else not extracting the traffic information data.

2. The method of claim 1, further comprising:

storing a license number and a confirming access code on the writable portion of the storage medium, and wherein said determining whether or not said generated access code meets a given access code criterion includes comparing said generated access code to_the stored confirming access code to enable extraction of the traffic information.

3. The method of claim 1, wherein the navigation unit is provided with a readable serial code and wherein the navigation device is arranged to_read said serial code and to extract information from said radio signal on the basis of said serial code. device comprising:
- a receiver for receiving information that is transmitted in encrypted form;
- a reader for reading data from a storage medium;
- a storage medium, which stores a decryption code, which allows decrypting at least a portion of received information that is in encrypted form and
- wherein the navigation device is provided for reading out the decryption code from the storage medium and to encrypt received information from a broadcast radio signal by use of the decryption key.

* * * * *